No. 871,630. PATENTED NOV. 19, 1907.
H. RICHARDSON.
DISCHARGE CONTROLLING MECHANISM FOR WEIGHING MACHINES.
APPLICATION FILED NOV. 7, 1905. RENEWED APR. 6, 1907.
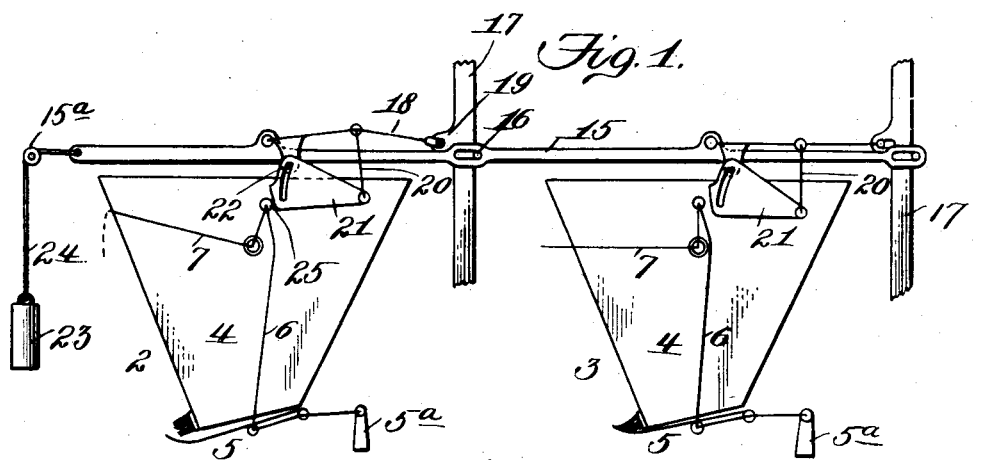
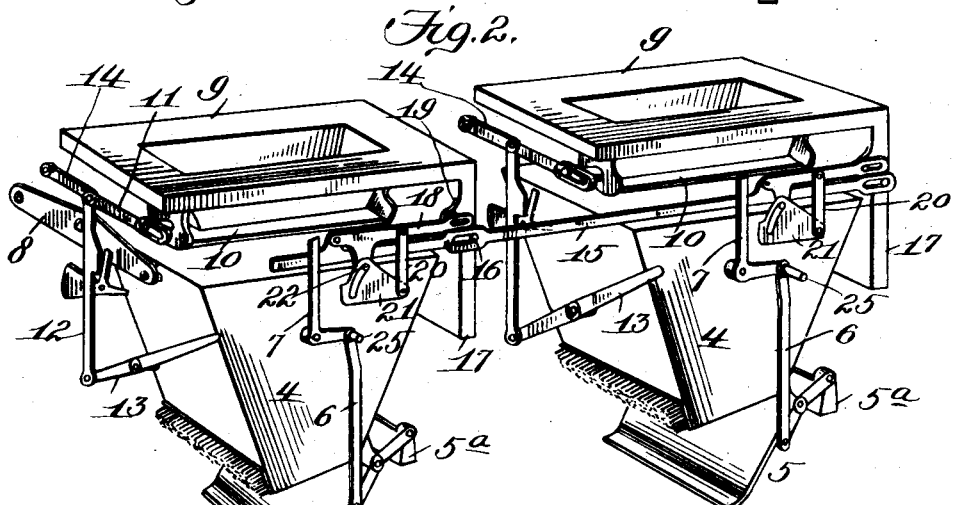
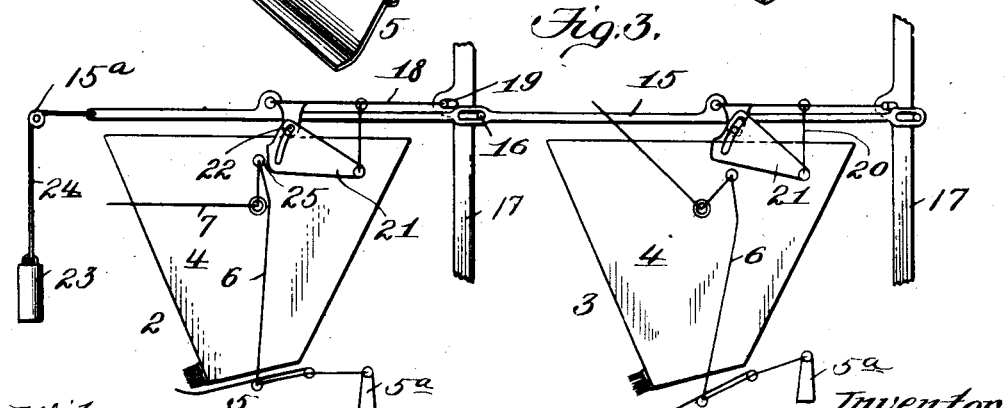
Witnesses
C. D. Kesler
H. B. Keefer
Inventor
Henry Richardson
By James L. Norris
Atty.

UNITED STATES PATENT OFFICE.

HENRY RICHARDSON, OF NEW YORK, N. Y.

DISCHARGE-CONTROLLING MECHANISM FOR WEIGHING-MACHINES.

No. 871,630.           Specification of Letters Patent.        Patented Nov. 19, 1907.

Application filed November 7, 1905, Serial No. 286,254. Renewed April 6, 1907. Serial No. 366,839.

*To all whom it may concern:*

Be it known that I, HENRY RICHARDSON, a subject of the King of Great Britain, residing at New York, in the county of New York and State of New York, have invented new and useful Improvements in Discharge-Controlling Mechanisms for Weighing-Machines, of which the following is a specification.

This invention relates to discharge controlling mechanism for weighing apparatus, the object of the invention being to provide simple and effective means of this character for assuring, in a positive manner, the simultaneous discharge of a plurality of receptacles, that is, two or more.

In order to indicate the advantages of the invention, I have illustrated in the accompanying drawings weighing machines of a familiar type, for the reason that the weighing machines themselves form no part of the invention. I have also represented in said drawings a simple form of embodiment of the invention, which I will describe in detail in the following description, to enable those skilled in the art to make and practice the invention, but divers changes may be made within the scope of my claims. I deem it expedient to state at this point that the capacity of the machines or of their buckets or other load carriers may be equal or different, as particular occasion may require.

Referring to the drawings: Figure 1 is an elevation of parts of two weighing machines and load discharge controlling mechanism associated therewith, including my invention. Fig. 2 is a perspective view of the parts shown in Fig. 1 and also showing the supplying means and certain other parts. Fig. 3 is a view like Fig. 1.

In Fig. 1 I have shown one closer released and the other locked closed. In Fig. 2 I have shown both closers wide open, and in Fig. 3 I have shown one closer locked shut and the other one in the act of being shut.

Like characters refer to like parts throughout the different views.

From what has been hereinbefore stated, it will be apparent that my discharge controlling means may operate successfully in connection with any number of weighing machines. To avoid complexity of illustration I have shown two weighing machines of a standard construction. As a matter of fact the two machines are practically the same as those illustrated in a number of U. S. patents granted to me, to none of which I need specifically refer, for the reason that I will, in order to set forth the mode of operation of the novel features of this invention, briefly outline the structures of said machines. I will, to distinguish them from each other, denote one by the character 2 and the other by the character 3. Each machine includes a bucket, as 4, having a discharge gate or closer 5 at its bottom. The said closer or discharge gate is moved to its shut position through the agency of the customary weight $5^a$. It is held shut by an inverted toggle, made up of the rod 6 and one arm or branch of the angle lever 7, fulcrumed at its angle to the bucket 4. The rod 6 is connected at its lower end to the closer 5, and at its upper end to the shorter arm of the angle lever 7. When the toggle, made up of the said rod and one arm of the angle lever, is in its working position, the closer or discharge gate 5 will be held shut. When the toggle centers however are thrown out of line, the closer 5 will be released. From the statements just made, it will be evident that I will describe somewhat in detail one weighing machine, such description applying to the other, as the two represent duplicate constructions, although, as previously indicated, the capacities of the two buckets need not be the same.

It will be evident, as will hereinafter appear, that each of my several weighing mechanisms involves a load discharge controlling member. In the present case these members are the closers 5. Means are provided for positively releasing these closers. In addition to the closer releasing means I provide means for preventing the movement of the closers until all of them have been released.

In the drawings I have illustrated the parts of the weighing machines somewhat diagrammatically, for I consider this only necessary; and in Fig. 2 I have illustrated stream supplying means for the two buckets, and in part a beam, designated by 8, for carrying the bucket 4 on the left. The stream supplying means (see said Fig. 2) is represented in each case as including a hopper, as 9, arranged directly over the respective buckets, and under each hopper is a valve, as 10, indicated as being of the pan type. To each valve 10 is connected a toggle, as 14, which, when each valve is fully closed on the making up of a load in the two buckets, is straightened. The other ends of the toggles are connected to the framing of the weighing machines, and at the junction of the links thereof there depend rods, each designated by 12, to the lower ends of which are connected levers, as 13. When a valve 10 closes, the toggle 11 connected therewith will, as set forth, be straightened, so as to thrust the rod 12 downward, and depress one arm of the lever 13, the opposite or free arm of said lever being elevated and being carried against the free end of the long branch of the coöperating angle lever 7, so as to unlock the toggle of which one branch of said lever forms a part, the other part of the toggle consisting of the rod 6.

In connection with the plurality of weighing machines, which I wish clearly to state may be of any kind, I provide what I term a movably mounted controlling member, of some suitable character. The one illustrated I denote in a general way by 15, it being capable of longitudinal reciprocation and consisting of a rod. This movably mounted controlling member has associated therewith a plurality of locking means, each weighing machine being adapted to operate one locking means into a controlling member releasing position. From this it will be evident that, notwithstanding the fact that one weighing machine may operate one locking means, the other locking means is still effective to hold the controlling member against motion, by reason of which the controlling member cannot shift until all the locking means are operated, so that I assure absolutely the simultaneous discharge of the several weighing machines. In the adaptation of the invention illustrated, the locking means agree in number with the weighing machines, two of course being illustrated in the drawings. They may be of any suitable nature, although I have found toggles very satisfactory for the purpose, one end of each toggle being connected with the member 15, and the other end with some part that is fixed with respect to said member 15, for example, the framing of the apparatus. In the form of the device illustrated it is desirable that the member 15 should move back and forth in a straight manner, it following, in the present case, a horizontal direction. To bring about this result, I have shown pins, as 16, upon the flanges 17 depending from the two hoppers 9, and which pins pass through remotely disposed elongated slots extending lengthwise of the said member 15.

I will describe in detail one locking means for the member 15, as the same will suffice for the other, as, in the present instance, they are of duplicate construction. The said locking toggle involves two links, which will each be denoted by 18, the link 18 on the left being pivoted at its outer end to an ear or lug upon the member 15, while the other link has a loop or elongated slot at its outer end to receive a pin 19 on the framing of the machine, a part of which is the flange 17 which directly carries said pin. At the pivotal connection between the two links 18 there is jointed a third and pendent link 20, shown as pivoted at its lower end to the segment 21, which has an arcuate slot concentric with its axis of motion to receive a pin 22 upon a downwardly extending lug on the link 18 on the left. From this it will be apparent that the segment 21 is capable of motion independently of the locking means or toggle with which it is directly coöperative. The reason for this will hereinafter appear.

As previously indicated the member 15 is reciprocative, it being held normally in its backward position in some positive manner, for example, by a weight 23, suspended from a chain 24 connected to one end of the member 15 herein shown as the left end of said member, the chain or other flexible connector extending over a suitably mounted guide sheave or pulley $15^a$, substantially in horizontal alinement with the member 15. When the member 15 is moved toward the right, the weight 23 is naturally lifted, by virtue of which said weight, by dropping when the member 15 is released, can return the latter to its primary position.

By the organization illustrated it will be apparent that the controlling means is wholly independent of the weighing machines, so that each can be loaded independently of the other. One of the weighing machines can have its closer released, but the load thereof can not be discharged until the other closer is released.

Each toggle mechanism, coöperative with the member 15, (and I consider the swinging members or segments 21 as constituting part of such toggle mechanism) is in the path of a moving part of the coöperating weighing machine, which moving part may be the laterally extended pivot 25, a part of the toggle of said weighing machine, made up of the rod 6, and one arm of the angle lever 7.

In Fig. 1 I have shown the rod 15 as occupying its normal position or the backward position thereof. One of the weighing machines, or the one on the left in said Fig. 1, has had the closer 5 of its bucket released. When the closer is released, it of course is opened by the weight of the material supported upon the same, and as it opens, the pin 25 connected therewith will strike the adjacent segment 21 and will flex upward the coöperating toggle, made up of the links 18, through the agency of the link 20, this being permitted by reason of the fact that the link 18 on the left has a sliding connection with the pin 19. Only a slight upward flexure of the toggle on the left however is permitted. In other words the toggle is given an initial flexure but not sufficient to permit the opening of the closer 5 to an extent to cause the gravitation of the material from the bucket. Further movement of the closer 5 on the left is prevented by reason of the fact that the rod 15 cannot be advanced, owing to the fact that such advancing movement is prevented by the toggle on the right in said Fig. 1. When however the closer 5 on the right is released and opened, and when the coöperating pin 25 strikes the coöperating segment 21, the toggle on the right in said figure will be flexed upward, and as both toggles are then flexed, the rod can be thrust to the right by the two closers, which are then fully released, so that said closers can be opened wide to permit the discharge of the contents of the two buckets 4. When the two pins 25 pass free of the respective segments 21, the rod 15 will be released, so that it can be returned to its original position by the falling of the weight 23. As a closer shuts, the coöperating pin 25 will be thrust upward, and as it moves in an upward direction, it will strike and then lift the coöperating segment 21. From this it will be evident that the two closers can shut in succession, so that if the shutting of one be retarded, the proper action of the apparatus will not be affected, but by virtue of the described construction, it is not possible to discharge the two machines in any other way than in synchronism. The members 21 can be properly considered as by pass devices, for when operated from one direction, they become effective for securing a certain result, but when operated in the other direction, they are ineffective and simply recede without securing any positive function, but a permissive result which, in the present case, is the shutting, without hindrance, of a closer.

Each weighing machine comprises a shiftable load discharge controlling member and means for positively initially releasing such load discharge controlling member. In addition to such organization, there is provided independent means for preventing full movement of said shiftable members until they have all been released.

Having thus described the invention, what I claim is:

1. The combination of a movably mounted controlling-member, a plurality of locking means therefor, and a plurality of weighing machines, each adapted to operate a locking means into its controlling-member releasing position.

2. The combination of a movably mounted controlling-member, a plurality of locking means therefor, a plurality of weighing machines, each arranged to operate a locking means into its controlling-member releasing position, the said controlling-member, when all the locking means are released, being arranged to be advanced, and means for returning said controlling-member to its original position.

3. The combination of a movably mounted controlling-member, a plurality of locking means therefor, a plurality of weighing machines, each arranged to operate a locking means into its controlling-member releasing position, the said controlling-member, when all the locking means are released, being arranged to be advanced, and a weight connected with said controlling-member for returning it to its original position.

4. The combination of a movably mounted controlling-member, a plurality of toggles constituting locking means for said member, and a plurality of weighing machines for moving the toggles to their inoperative positions.

5. The combination of a movably mounted controlling member, a plurality of locking means therefor, each having a by-pass device, a plurality of weighing mechanisms each involving a bucket and a shiftable member, devices for supplying the buckets with streams of material, and valves for controlling the streams, said valves serving when they have cut off the supply streams to operate the shiftable members and cause the latter to act against the respective by-pass devices and move the locking means into inoperative positions.

6. The combination of a movably mounted controlling-member, a plurality of toggles connected with the movably mounted member, links pendent from the toggles, swinging members connected with said links, and a plurality of weighing machines, each adapted to act against a swinging member to move the toggle to an inoperative position.

7. The combination of a movably mounted controlling-member, a plurality of toggle mechanisms normally adapted to prevent movement of the controlling member, and a plurality of weighing machines, each having a bucket provided with a closer, and means, movable with the closer, for operating the respective toggle mechanisms to put them into their inoperative positions.

8. The combination of two weighing machines, each including the following: a load receiver, stream supplying means for the load receiver, and means for effecting the discharge of the load from the load receiver, and means, independent of the machines, for preventing the discharge of any one of the machines until they are all ready to discharge.

9. The combination of a plurality of weighing machines, and means, independent of the machines, for preventing the discharge of their load receivers until they are all ready to discharge the machines being otherwise independently operative.

10. The combination of a plurality of weighing mechanisms each having a shiftable load discharge controlling member; means for normally preventing movement of each of said shiftable load discharge controlling members, means for positively initially releasing each of said load discharge controlling members, and independent means for preventing full movement each of said shiftable load discharge controlling members until they have all been released.

In testimony whereof I have hereunto set my hand in presence of two subscribing witnesses.

HENRY RICHARDSON.

Witnesses:
   CLAUDE COPE,
   M. M. RONNER.